United States Patent Office 3,287,197
Patented Nov. 22, 1966

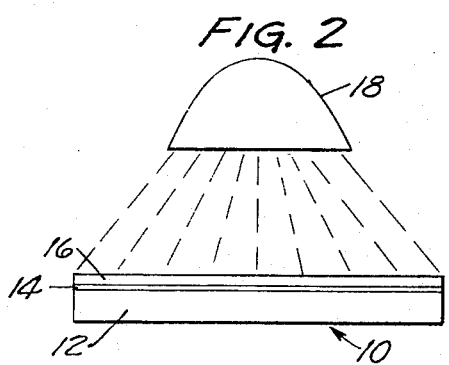
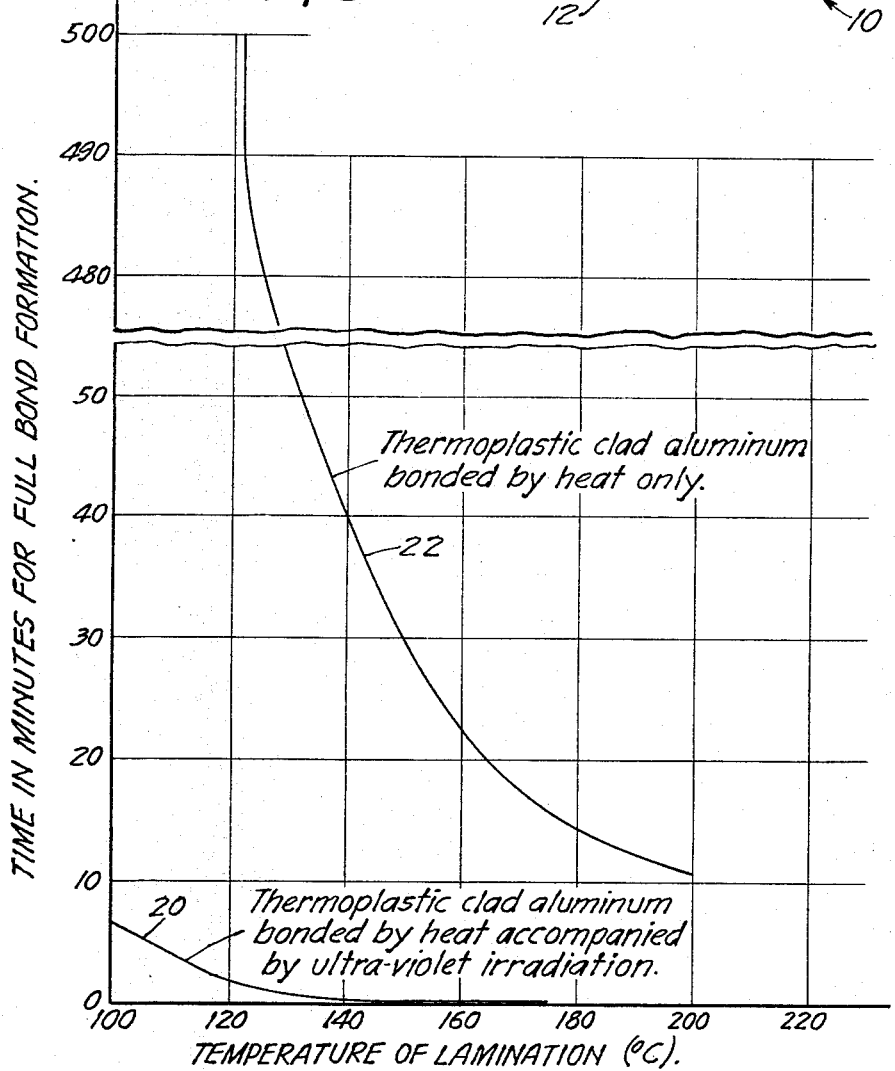
INVENTOR
LOUIS A. ERREDE

3,287,197
PROCESS FOR PERMANENTLY CLADDING AN INORGANIC SURFACE WITH PLASTIC AND PRODUCT MADE THEREBY
Louis A. Errede, Roseville, Minn., assignor to Minnesota Mining and Manufacturing Company, St. Paul, Minn., a corporation of Delaware
Filed Jan. 25, 1963, Ser. No. 253,943
22 Claims. (Cl. 156—272)

The present invention relates to the plastic cladding of inorganic surfaces and more particularly relates to permanently cladding inorganic surfaces, particularly metal surfaces, with plastic overlayers.

In the past the protection of inorganic surfaces, particularly metal surfaces of electrically conductive solid metals and alloys thereof, e.g. aluminum, copper, iron, zinc, nickel, gold, silver, etc., has normally been by way of paints, protective lacquers, greasy lubricants, and such overlayer treatments, as galvanizing, electroplating, etc. In the case of protective paints, lacquers, etc. there is a constant need for re-applying the protective coating as it wears off or flakes off or otherwise deteriorates. Further, such coatings generally conceal or change the appearance of the surface from the natural state of the metal. For example, one of the more recent protective devices in the field of aluminum has been to anodize the aluminum, which changes the color of the aluminum. Thus, for long term protection, often this is gained at the expense of the appearance or at least by a change in appearance of the surface.

Plastic cladding of wires, sheet materials and other metal surfaces to protect from corrosion, preserve metal appearance, insulate, etc. has long been known. The advantages that flow from plastic coatings are well known such as the provision of coatings which have extremely long wearing possibilities, which are quite inert to most metal corroding substances, which have good electrical insulating characteristics, etc. The inertness and ease of application to desired thickness of thermoplastics such as polyethylene and the like make their use as cladding or coating plastics highly desirable.

One of the primary problems encountered with plastic coated inorganic surfaces, particularly metal surfaces, but also such surfaces as glass, asbestos, concrete and the like, has been to provide sufficiently strong adherence of the plastic to the substrate to prevent ready delamination or separation of the plastic layer from the surface cladded therewith. While adhesives are available to bond plastics to metals, adhesives are not entirely satisfactory as they may deteriorate with age, embrittle, or discolor, or tend to plasticize the plastic coating or otherwise be unsuitable.

An important object of the present invention is to provide adhesive-free plastic clad inorganic surfaces wherein the plastic and the surface of the substrate clad therewith are permanently united or bonded, i.e., a sufficiently strong bond is formed between plastic and substrate that the layers cannot be mechanically separated from one another. Another object of the invention is to provide a method of cladding metal surfaces with plastic and without intervening adhesives wherein permanent union of the plastic to the inorganic surface is achieved with extreme rapidity. A further object of the invention is to provide a method for cladding metal surfaces with thermoplastic polymers by chemically interbonding the plastic super layer to the inorganic metal substrate with great rapidity and relatively low temperatures. Another object of the invention is to provide thermoplastic polymers chemically interbonded with metal surfaces. Other and further objects and advantages will become apparent as the description proceeds.

In accordance with the present invention I have discovered that an inorganic surface may be permanently clad with a thermoplastic polymer by first treating the inorganic surface with a primer composed of a non-adhesive organic compound strongly adherent to the metal surface and containing one or more ultraviolet light sensitive groups, e.g. centers of unsaturation, e.g. ethylenic, acetylinic, conjugated diene and aromatic groups, functional groups, e.g., carbonyl, amino, amido, mercapto, and carboxyl groups, which are activated by ultraviolet light or wavelengths of between about 2000 A. and 3600 A., thereafter overcoating the treated surface with a layer of thermoplastic polymer and subjecting the interface formed between the treated surface and the thermoplastic polymer to heat and ultraviolet irradiation. By maintaining the cladding thermoplastic polymer at a temperature above its softening point and below its decomposition temperature intimate contact is maintained at the interface of the treated inorganic substrate and the plastic overlayer. While maintaining this intimate contact ultraviolet light of a wavelength of between 2000 A. and 3600 A. (which readily passes through air) is transmitted through the thermoplastic polymer to the interface between the polymer and the treated surface of the substrate for a time and at an intensity sufficient to permanently interbond the plastic to the substrate. Assuming the same irradiation conditions and plastic layer thickness it has been found that the time for permanent cladding is roughly inversely proportional to the temperature at which the irradiation is carried out.

While the cladding layer can be quite thick, adequate thicknesses usually range from 0.25 mil (0.00025 inch) or less to about 5 or 6 mils (0.006 inch). Thicknesses greater than 5 mils are seldom desirable, though possible, since they add weight and cost without corresponding increase in protection.

The invention has particular utility with respect to cladding conductive and lustrous metals which are subject to corrosion and/or discoloration, e.g., iron, steel, aluminum, copper, brass, bronze, silver, etc. Not only does the present invention provide a means for permanently cladding such metals with ultraviolet (sometimes abbreviated as "U-V") transparent thermoplastic polymers, but further provides a means whereby the laminates so formed can be readily adhered to other similar laminates, or other surfaces to which the thermoplastic overlayer is strongly adherent. Consequently, the present invention is useful both in the formation of protective coatings for metal sheets, wires, and the like and in providing a means whereby metals can be more readily laminated to one another through the medium of the plastic overlayer, or whereby metals can be laminated to other materials such as wood, ceramics, concrete, etc.

The thermoplastic polymers useful in the practice of this invention are those which are free from groups which are strongly absorptive of ultra-violet light at wavelengths of about 2000 to 3600 A. such as vinyl, phenyl, carbonyl, and other ultra-violet light absorbing groups. As a rule, thermoplastic polymers having extinction coefficients ($e$) with respect to actinic radiation of no more than about 40 mil$^{-1}$ at a plastic film thickness of about 0.25 mil and no more than about 2 mil$^{-1}$ at about 6 mils thickness may be used in the practice of this invention. Useful polymers are those which consist essentially of carbon-hydrogen, carbon-halogen and carbon-hydrogen, or carbon-halogen, wherein some of the carbon valences are satisfied by halogens other than fluorine, e.g., polymers other than polytetrafluoroethylene. Thus, polymers such as polychlorotrifluoroethylene, polyvinyl chloride, polyvinyl fluoride, are useful in the practice of this invention. Preferred thermoplastic materials are those consisting essentially of carbon and hydrogen such as the polyolefin polymers, e.g. polyethylene, polypropylene, etc. which are U-V transparent and provide extremely inert, abrasion resistant, clear surfaces which inherently resist dust accumulation and are easily cleaned. Further, these polymers in addition to being safe for use around foodstuffs have relatively low softening temperatures whereby they in themselves serve as excellent heat sealing media for joining substrates clad therewith to the same or similar plastics, making their use in the coating of metal foils and the like to produce plastic lined metal packaging films extremely practical.

By "extinction coefficient" sometimes hereafter abbreviated as "$e$," as used herein is that calculated by the formula following:

$$e = \frac{2.3 \log (Io/I)}{d}$$

$Io$=intensity of incident light striking plastic surface
$I$=intensity of light reaching interface between plastic overlayer and treated inorganic substrate
$d$=thickness of plastic overlayer in mils
$e$=extinction coefficient in mil$^{-1}$ In the event $e$ is outside of the bounds noted hereinbefore, permanent bonds can still be achieved in some instances between the plastic cladding and the substrate with extreme heat and/or light intensity or long exposure. But these requirements often result in degradation of the plastic or require such inordinately long bonding times as to be simply laboratory curiosities. As a practical consideration, it is the quickness with which the bond is formed that constitutes the most practical advance in the art; with this invention, the bonds can be formed in matters of seconds.

In the priming of the inorganic substrate, the primer may comprise any organic compound which inherently forms permanent bonds with metal and similar surfaces, as by ionic substitution, chemisorbtion or absorption, and which further contains ultraviolet light sensitive groups, e.g. carbonyl, oxime, aromatic heterocyclic amine, amine, amide, phosphenate groups, etc., which are activated by ultraviolet light in wavelengths of between about 2000 A. and 3600 A. to cause chemical bonding between primer and plastic. Among such compounds are those which are often used as metal surface preservatives such as the organic fatty and other carboxylic acids, e.g., stearic, oleic, benzoic, caproic, acetic, cinnamic, and phthalic acids, the mercaptans, such as alpha-mercapto stearic acid, octadecyl mercaptan, and benzyl mercaptan, as well as oximes, e.g., acetophenoxime and benzophenoxime, and phosphenates, as for example octadecyl phosphenate. In the cladding of metals fatty acids are generally preferred primers and in many instances are already present as surface preservatives on metals.

The primer should be spread quite thinly on the inorganic substrate surface with only about monomolecular thickness at the contact areas of the plastic and the substrate. Such monomolecular thicknesses can be readily obtained simply by dipping the foil, sheet, wire, or other article to be clad, into a free flowing water-like solution of the primer and thereafter washing or firmly wiping off excess primer. Of course, the primer can be calendered on and excess thereafter wiped off, or even washed off in the event the metal-organo layer formed by the primer is insoluble in the washing material so that only the excess is washed off. It is not necessary that the primer be in monomolecular thicknesses throughout the surface to be clad since in those crevices or other surface indentations which the plastic will not contact even upon flow, thicker layers than monomolecular are permissible and do not effect the efficiency of the process. For precise monomolecular control, where it should be necessary or deemed desirable, the techniques developed by Drs. Langmuir and Blodgett as described in J. Am. Chem. Soc. 57, 1007 (1935) may be used. However, in general such precise controls are not necessary and ordinary dipping and wiping or washing operations are sufficient to remove the excess, leaving only the desired primer thickness on the treated surface. In the case of extruded aluminum a monomulecular layer of fatty acid is usually present already as a residue of the extrusion process so that no separate priming step is necessary.

The thermoplastic polymer may be applied to this treated surface in the form of a self sustaining film; it may be cast in place from solvent solution; or, it may be dip coated from hot melt, or applied by other techniques known to the art.

Upon application of the thermoplastic polymer, there is formed a laminate of the kind shown in FIGURE 1 of the accompanying drawing. The laminate 10 comprises a metal substrate 12, treated on one surface with a primer 14 and then clad with a plastic overlayer 16.

FIGURE 2 illustrates treatment of the laminate of FIGURE 1. Once the laminate is formed, intimate contact is maintained between the thermoplastic 16 and the primed surface 14 of the metal 12 by maintaining the temperature in a range of form about 100° C. to about 200° C., depending of course on the softening and melting temperatures of the plastic overlayer. If the plastic is applied by extrusion or from a hot melt an elevated temperature is already present that need only be lowered sufficiently to permit the plastic to solidify and maintain its cladding shape. While maintaining intimate contact between plastic and treated surface, ultra-violet light of a wavelength of from about 2000 A. to about 3600 A. from an artificial source such as that illustrated by numeral 18 is passed through the film layer 16 to the interface formed between the film layer and the primed metal surface. This light serves to activate the light-sensitive groups of the primer to chemically bond to the thermoplastic overlayer and thereby permanently adhere the plastic to the primed surface.

While heat will also serve to activate the molecules of the primer to create interbonding between the primed surface and the plastic, when heat alone is used for this purpose, the time is inordinately long, being too long for practical utility in most instances. The disparity in time for bond formation between plastic and primed surface by the use of simple heat and by the combination is dramatically illustrated in the graph, designated as FIGURE 3 in the accompanying drawing, wherein the time for achieving full bond formation in minutes is plotted against temperature at which bonding is carried out.

The preparation and testing of the plastic clad laminates from which the information plotted in the graph of FIGURE 3, was obtained is set forth in the example following.

*Example 1*

Hard aluminum foil of 1½ mil thickness which had been extruded and as the result thereof inherently possessed a surface treated with a monomolecular layer of stearic acid had laminated thereto a 2 mil thick layer of polyethylene. The polyethylene was applied from a self sustaining film by simply laying it upon the aluminum substrate, and rolling it into intimate contact therewith with a hand roller. At one end of the laminate so formed, a slip sheet of Teflon was inserted between the polyethylene and the aluminum substrate to provide separated end tabs for a purpose to be described subsequently.

A number of such laminates was prepared by rolling on the polyethylene at a temperature of about 125° C. The samples were then divided into two groups, one to be subjected to a combination of heat and ultraviolet irradiation and the other to be subjected simply to heat. Lamination at this temperature provides temporary adherence of the polyethylene to the aluminum substrate, this adherence remaining only so long as the heat is maintained. The Teflon inserts provide end tabs for the polyethylene and foil whereby after treatment the bond of the polyethylene to the stearic acid primed aluminum foil surface can be mechanically tested by grasping the end tabs and attempting to mechanically strip the polyethylene from the substrate.

The thus prepared laminates were treated at various temperatures as follows. For the first test, one group of laminates was kept at 100° C. for varying periods of time. Another group of laminates was also kept at 100° C. for varying periods of time and in addition each laminate in this group was simultaneously irradiated with ultaviolet light. At the end of each pre-selected time interval, each laminate subjected to this time interval was cooled to room temperature and attempts made to mechanically strip the polyethylene from the foil substrate measured. Such tests were carried out by cementing the exposed foil surface to a rigid member and clamping the end tab of the foil surface and the rigid member to one jaw of an Instron testing machine. The free end tab of the polyethylene, after removal of the Teflon slip sheet, was then clamped in the other jaw of the Instron testing machine and the jaws pulled apart at a rate of two inches per minute so that the bond stripping rate was one inch per minute. The strip back angle was 180°. The tests were carried out at approximately 23° C. in an atmosphere of about 50% relative humidity. A "full bond" was evidenced by failure to mechanically disrupt the bond between the primed surface and the plastic as evidenced by the tearing of the polyethylene without separation of the lamimnated polyethylene from the primed aluminum foil substrate.

Irradiation of the laminate interface through the polyethylene was provided by a G15 T8 General Electric germicidal lamp which has a strong emission at 2537 A. The light-to-film distance was approximately 2 inches. As shown by the line 20 at 100° C., with ultraviolet irradiation the time necessary for a full bond was approximately 8 minutes. At a temperature of about 160° C. with ultraviolet irradiation the time necessary for a full bond had decreased to a few seconds or less, bond formation being substantially instantaneous.

In those samples where only heat was used without light, plotted by line 22 of the graph of FIGURE 3 a full bond was not obtained at 100° C. even after 500 minutes, and the first full bond obtained was obtained at 125° C. after 500 minutes of heating. Even when the temperature was raised to 200°, the bonding time was still on the order of about 11 minutes.

Comparable results were observed with oxidized aluminum sheets coated with stearic acid, lauric acid, caproic acid, cinnamic acid, acetic acid, benzoic acid, etc. In general these are more difficultly permanently clad than those treated during extrusion because of the further oxidation. But, in all instances at temperatures on the order of about 160° C. accompanied by irradiation of the kind described, permanent cladding occurred in a matter of less than 30 seconds.

With polyethylene clad metals, in general irradiation should occur while the laminate is from about 125 to 200° C. Preferably, the temperature of the laminate during irradiation is in the range of 150–170° C., or higher if desired, as at about 150° C., the time for permanent bonding is reduced to a few seconds and less.

*Example 2*

A copper-polyethylene laminate was prepared by first treating a 3 mil thick copper foil by melting cinnamic acid onto the foil and washing away the excess with acetone. Then, using a hand roller, the polyethylene was rolled into place on the cinnamic acid treated surface of the copper at 125° C., the polyethylene being in the form of a self sustaining 2 mil thick film. While maintaining the temperature of the laminate so formed at about 125° C., the interface between the treated copper surface and the polyethylene film was subjected to irradiation from the lamp, and with the lamp to film distance of Example 1 for a period of about 15 minutes, at which time permanent cladding resulted. By raising the temperature the time for bonding is decreased in substantially the same ratio as was observed with the aluminum previously. Excellent bonds can be formed with copper surfaces treated with mercaptans and oximes by following substantially the same procedures noted hereinbefore with respect to the cinnamic acid. It is generally not desired to use the fatty acids and other carboxylic acids which form soluble salts with the copper as treating agents since they are too easily removed in the washing process. However, where the excess is removed by burnishing, rubbing, or some other action than washing off the excess, such acids will serve as priming agents.

*Example 3*

Polyethylene was laminated to stainless steel plates and soft steel plates at approximately 150° C. by first priming the steel with either cinnamic acid or acetic acid, and irradiating as noted in Example 1 for a period of somewhat less than 2 minutes to obtain full bonds.

*Example 4*

Lead foil was primed with cinnamic acid by melting the cinnamic acid onto the lead foil and then washing off the excess. The foil so primed had applied thereto a 2 mil thick polyethylene film by hand rolling thereon at a temperature of about 127° C. After hand rolling, and while maintaining the temperature at 127° C., the laminate was exposed to ultraviolet irradiation in the manner set forth in Example 1 through the polyethylene film for a period of approximately 7 minutes, at the end of which time a full bond was found to have been formed. Here again, the time necessary for bonding decreases sharply with rises in temperature.

*Example 5*

A piece of tin plate, heated to 123° C., had applied thereto by hand rolling a self-sustaining film of polyethylene approximately 2 mils thick. The laminate so formed was then subjected to irradiation as in Example 1 to form a permanent bond at 123° C. in less than 6 minutes. Here again, as the temperature at which irradiation takes place is raised, time for permanent bonding is decreased. As noted previously, the rate of bonding is roughly inversely proportional to the bonding temperature.

*Example 6*

A glass plate was coated with benzoic acid by melting the benzoic acid onto the glass and thereafter washing off excess benzoic acid with acetone. Polyethylene film of 2 mil thickness was then laminated to the glass by hand rolling at a temperature of about 130° C. and exposed to ultraviolet irradiation from the source and at the distance noted in Example 1 for a period of about 10 minutes. At the end of this period it was found that a full bond had been obtained between the treated glass surface and the polyethylene film as evidenced by the mechanical stripping test on the Instron testing device noted previously.

*Example 7*

A polyethylene-mica laminate was made by first treating the surface of a natural mica sheet with cinnamic acid, washing the acid off with acetone and thereafter applying polyethylene to the surface so treated. By a combination of heat and irradiation as described previously, permanent bonds were readily obtained between the primed mica surface and the polyethylene which could not be mechanically disrupted.

With both natural mica and synthetic mica (e.g. fluorinated micas such as those of Hatch Patent No. 3,001,571) laminates, the bulk of the mica may be readily stripped from the polyethylene leaving a thin layer of mica permanently adhered to the polyethylene and imparting to the polyethylene surface a pleasant, frost-like appearance in the case of synthetic mica sheets and a transparent mica coating in the case of natural mica. The remaining permanently attached mica provides a surface that is extremely receptive to ordinary ink. Mica coated polyethylenes formed in this manner may be readily permanently printed on without utilization of special inks, or smudging problems. This mica surface is as ink receptive as ordinary paper and neither the mica nor the printing are removed even after vigorous washing of the mica coated polyethylene with soap and water.

When synthetic mica (Patent No. 3,001,571), coated with cinnamic acid, is deposited onto polyethylene or polytrifluorochloroethylene polymer films from a slurry of a volatile liquid, e.g. actone, and the coated product heated (to 200° C. in the case of the $C_2F_3Cl$ polymer) and simultaneously irradiated, the resultant coated polymer film, after washing with soap and water, maintains its original transparency although it now tenaciously retains printing from greasy ink thereon. Under a microscope, however, the individual mica platelets on the polymer film surface are visible as little islands.

From the foregoing it will be apparent that the present invention provides a means for obtaining extremely strong inorganic surface-to-thermoplastic polymer bonds in commercially useful time periods.

Of course, all priming agents do not work on all inorganic surfaces and priming agents are selected which are known to be chemically adsorbed, or chemisorbed with the surface being primed. For example, the use of carboxylic acids on copper as the priming agent while it would give a very strong mechanical bond would also make the laminate sensitive to water separation by dissolution of the primer after the bond was formed.

As will be apparent from the description preceding, sandwiches, sealed packages, and other and further articles can be made by joining two or more laminates to one another as by solvent softening of contacting thermoplastic surfaces, by heat sealing, or by other thermoplastic sealing means known to the art and all such modifications as well as other equivalent structures will be apparent to those skilled in the art.

I claim:
1. A process for permanently cladding an inorganic surface with plastic which comprises intimately contacting (1) an inorganic surface primed with an organic material containing ultraviolet light sensitive groups which are activated by ultraviolet light in wavelengths of between about 2000 A. and 3600 A. with (2) a thermoplastic polymer cladding layer, said polymer being selected from the group consisting essentially of carbon and hydrogen, carbon and halogens wherein at least some of the halogens are other than fluorine, and combinations of carbon with hydrogen and halogen, and (3) subjecting the laminate so formed to ultraviolet irradiation of wavelengths in the range of about 2000 A. to 3600 A. while maintaining intimate contact at the interface between the primed inorganic surface and the cladding layer and at a temperature between about 100° C. and 200° C. for a period of time sufficient to permanently adhere said cladding layer and said primed inorganic surface to one another.

2. A process for permanently cladding an inorganic surface with plastic which comprises intimately contacting (1) an inorganic surface primed with an organic material containing ultraviolet light sensitive groups which are activated by ultraviolet light in wavelengths of between about 2000 A. and 3600 A. with (2) a thermoplastic polymer having an extinction coefficient with respect to actinic radiation of no higher than about 40 mil$^{-1}$ at a polymer thickness of 0.25 mil and no higher than about 2 mil$^{-1}$ at about 6 mil thickness, and (3) subjecting the laminate so formed to ultraviolet irradiation of wavelength in the range of about 2000 A. to 3600 A. while maintaining intimate contact at the interface between the primed inorganic surface and the cladding layer and at a temperature between about 100° C. and 200° C. for a period of time sufficient to permanently adhere said cladding layer and said primed inorganic surface to one another.

3. The process of claim 1 wherein the inorganic surface is of glass.

4. The process of claim 1 wherein the inorganic surface is of mica.

5. The process of claim 1 wherein the inorganic surface is of metal.

6. A process of cladding a metal with a thermoplastic polymer having an extinction coefficient with respect to actinic radiation of no higher than about 40 mil$^{-1}$ at about 0.25 mil thickness and no higher than about 2 mil$^{-1}$ at about 6 mil thickness which comprises (1) forming an interface between said polymer and a surface of said metal which has been treated with an organic compound strongly adherent to said metal and which compound contains groups activated by ultraviolet light of wavelengths between about 2000 A. and 3600 A. by bringing said polymer and said treated metal surface into intimate contact with one another, and (2) irradiating said interface through said thermoplastic polymer with ultraviolet light of a wavelength in the range of about 2000 to 3600 A. while maintaining the temperature of the laminate between about 100° C. and 200° C. for a time sufficient to form a mechanically permanent bond between said polymer and said treated metal surface.

7. A process of cladding a metal surface with a thermoplastic polyolefin polymer layer having an extinction coefficient at 0.25 mil thickness of no higher than about 40 mil$^{-1}$ and at 6 mil thickness of no higher than about 2 mil$^{-1}$ which comprises (1) forming an interface between said polymer and a surface of said metal which has been coated with an organic compound strongly adherent thereto and which compound contains groups activated by ultraviolet light of wavelengths between about 2000 A. and 3600 A. by bringing said polymer and said treated metal surface into intimate contact with one another, and (2) irradiating said interface through said thermoplastic polymer with ultraviolet light of a wavelength in the range of about 2000 to 3600 A. while maintaining the temperature of the laminate between about 100° C. and 200° C. for a time sufficient to form a mechanically permanent bond between said polymer and said treated metal surface.

8. The process of claim 7 wherein said polymer is polyethylene.

9. The process of claim 7 wherein said polymer is polypropylene.

10. A process of cladding a metal with polyethylene which comprises (1) forming an interface between said polyethylene and a surface of said metal which has been treated with an organic compound strongly adherent to said metal which compound contains groups activated by ultraviolet light at wavelengths of 2000 to 3600 A. by bringing said polyethylene and said treated surface into intimate contact with one another, and (2) irradiating said interface with ultraviolet light at wavelengths of 2000 to 3600 A. for a time sufficient to permanently unite said polyethylene and metal, and (3) maintaining the temperature in the range of about 100 to 200° C. during irradiation.

11. The process of claim 10 wherein said metal is aluminum.

12. The process of claim 10 wherein said metal is copper.

13. The process of claim 10 wherein said metal is a ferrous metal.

14. The process of claim 10 wherein said metal is aluminum and said organic compound is a fatty acid.

15. The process of claim 10 wherein said metal is copper and said organic compound is selected from the group consisting of mercaptans and oximes.

16. A thermoplastic clad product made in accordance with the process of claim 1.

17. A thermoplastic clad metal laminate made in accordance with the process of claim 7.

18. A method of forming a mica surfaced polyethylene or polytrifluorochloroethylene film which comprises first priming mica with an ultraviolet light sensitive organic compound and thereafter forming an interface between the primed mica surface and a thermoplastic polymer overlayer selected from the polymer group consisting essentially of carbon and hydrogen, carbon and halogen wherein at least some of the halogen is other than fluorine, and combinations of carbon with hydrogen and halogen and subsequently subjecting the interface formed between the primed surface and the polyethylene to ultraviolet at a wavelength of from about 2000 to about 3600 A. while maintaining the laminate at a temperature between about 100° C. and 200° C. until the mica and polyethylene are permanently adhered to one another, then removing excess mica.

19. The method of claim 18 wherein said mica is natural mica.

20. The method of claim 18 wherein said mica is a fluorinated synthetic mica.

21. The method of claim 18 wherein said polymer overlayer is polyethylene.

22. The method of claim 18 wherein said polymer overlayer is polytrifluorochloroethylene.

References Cited by the Examiner
UNITED STATES PATENTS

| | | | |
|---|---|---|---|
| 2,943,955 | 7/1960 | Brill | 161—188 |
| 2,956,902 | 10/1960 | Greif | 117—132 |
| 3,002,854 | 10/1961 | Brill | 117—121 |
| 3,080,266 | 3/1963 | Haslam | 161—192 |
| 3,090,698 | 5/1963 | Wilson | 117—93.31 |
| 3,146,146 | 8/1964 | Anderson | 117—93.31 |
| 3,188,265 | 6/1965 | Charbonneau et al. | 161—188 |

EARL M. BERGERT, *Primary Examiner.*

HAROLD ANSHER, ALEXANDER WYMAN,
*Examiners.*